United States Patent [19]

Beseke et al.

[11] 4,006,454
[45] Feb. 1, 1977

[54] ANALOG TO DIGITAL CONVERTER FOR ASYNCHRONOUS DETECTOR

[75] Inventors: Kermit Myles Beseke, Schaumburg; James Robert Johannsen, Hanover Park; Ronald Howard Chapman, Wheaton, all of Ill.

[73] Assignee: Motorola, Inc., Schaumburg, Ill.

[22] Filed: May 7, 1975

[21] Appl. No.: 575,301

[52] U.S. Cl. .................. 340/146.1 R; 307/261; 328/28; 329/122; 331/1 R
[51] Int. Cl.² ............... H03K 5/18; G08C 25/00; H03K 5/13
[58] Field of Search ............. 307/261; 328/28; 329/122, 123; 331/1 R; 340/146.1 R, 146.1 AV, 146.1 D

[56] References Cited
UNITED STATES PATENTS

| | | | |
|---|---|---|---|
| 3,801,956 | 4/1974 | Braun et al. | 340/146.2 |
| 3,859,631 | 1/1975 | Holmes et al. | 340/146.1 R |
| 3,909,735 | 9/1975 | Anderson et al. | 329/122 |

*Primary Examiner*—R. Stephen Dildine, Jr.
*Attorney, Agent, or Firm*—James W. Gillman; Eugene A. Parsons; Sang Ki Lee

[57] ABSTRACT

In combination with an asynchronous detector for detecting a particular digital word within a train of signals wherein the detector samples each bit in the train a plurality of times and provides a comparison signal in response to a predetermined number of correlations between the samples and a stored word, an analog to digital converter including signal conditioning means having first and second modes of operations for converting a received analog signal to a digital signal in both modes of operation and inserting periodic error pulses in the digital signal in the first mode of operation and switch means coupled to the signal conditioning means and the detector for switching the signal conditioning means between the first and second modes of operation in response to a comparison signal from the detector. The signal conditioning means includes either a phase locked loop or a digital circuit which counts the time between transitions of the digital signal and inserts error pulses when the time between transitions exceeds a predetermined time.

19 Claims, 6 Drawing Figures

4,006,454

ANALOG TO DIGITAL CONVERTER FOR ASYNCHRONOUS DETECTOR

BACKGROUND OF THE INVENTION

The present invention pertains to an analog to digital converter and particularly an analog to digital converter in combination with an asynchronous detector such as described in U.S. Pat. No. 3,801,956, entitled "Asynchronous Digital Detector, " and assigned to the same assignee. The asynchronous detector is used in communications systems, as for example, mobile, portable or paging communications systems, where a binary word may be used to selectively call a specific receiver in the system. Since the communications system transmits and receives analog signals, these analog signals must be converted to digital signals before the asynchronous detector can operate on the signals.

The digital word transmitted by the system may be transmitted by itself or it may be superimposed on other high frequency information. Further, noise or other interference may accompany the work so that falsing or errors in word recognition may occur.

SUMMARY OF THE INVENTION

The present invention pertains to an analog to digital converter and particularly an analog to digital converter in combination with an asynchronous detector for detecting a particular digital word within a train of signals wherein the train of signals includes bits, each bit having a predetermined period, and the detector samples each bit a plurality of times, compares the samples to a stored predetermined word and provides a comparison signal in response to a predetermined number of correlations between the samples and the stored word, the analog to digital converter including signal conditioning means having an input for receiving an analog signal and first and second modes of operation for converting the analog signal to a digital signal in both modes of operation and inserting periodic error pulses in the digital signal when a digital pulse extends beyond a predetermined time in the first mode of operation, and switch means responsive to the comparison signal from the detector for switching the signal comditioning means from the first to the second mode of operation when a comparison signal is received.

The analog to digital converter may be either a phase locked loop with a relatively high lock frequency range and a lower lock frequency range for the two modes of operation, or a digital circuit wherein the signal conditioning means includes binary means and a source of clock pulses for converting the analog signal to a digital signal, comparison means coupled to the input and output of the binary means for sensing changes of state and counting means receiving the clock pulses and reset by an indication of a change of state from the comparison means, which counting means inserts error pulses into the digital output signal of the binary means when the time between changes of state thereof exceeds a predetermined time.

By injecting errors into the digital signal which is applied to the asynchronous detector the probability of the asynchronous detector falsing on frequency limited Gaussian noise is substantially reduced.

It is an object of the present invention to provide a new and improved analog to digital converter.

It is a further object of the present invention to provide a new and improved analog to digital converter in combination with an asynchronous detector for substantially reducing the noise falsing probability of the asynchronous detector.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBODIMENTS

Figure 1:
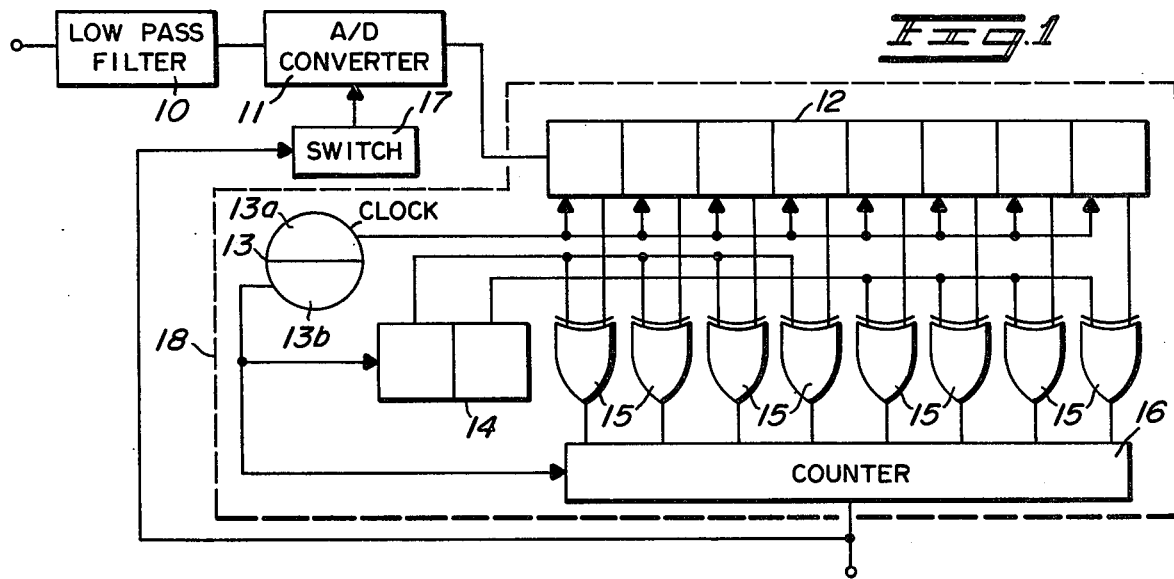
FIG. 1 is a block diagram of an asynchronous detector with an analog to ditial converter in combination therewith.

Referring specifically to FIG. 1, an asynchronous detector 18 is illustrated which, in this embodiment, is a binary detector adapted to detect a binary word in a signal train. A binary word consists of a predetermined order of binary digits or bits, wherein each bit has a predetermined period. The detector is capable of detecting the desired binary word without the need for synchronizing the receiver to the bit period timing. Signals, as for example, signals developed by a discriminator in a receiver (not shown), and including the desired binary word are coupled to a low pass filter 10. Low pass filter 10 attenuates all signals above a particular frequency in order to eliminate undesirable high frequency noise signals and information signals, i.e., voice, etc., which can interfere with detection of the desired binary word. Also, in some instances, the data word may be superimposed on other high frequency information and the low pass filter 10 removes most of the unwanted high frequency information. It is desirable that the cut off frequency of the filter 10 is selected to be approximately one half the sampling rate, as will be described presently. In practice, the cut off must be significantly less than half the sample rate. The description of the operation will be brief because the entire circuit and the operation thereof is completely disclosed in U.S. Pat. No. 3,801,956, which patent is incorporated herein by reference.

The signals passing through the low pass filter 10 are coupled to an analog to digital converter 11, which will be described in more detail presently. The signals appearing at the output of the A/D converter 11 are then binary signals. The signals from the A/D coverter 11 form a train of binary signals which are coupled into a multistage shift register 12. A clock circuit 13 has a portion 13a which is coupled to the shift register 12 and generates a number of first clock pulses within the interval of a bit period. For example, the clock circuit portion 13a generates four first clock pulses within the interval of a bit period and, therefore, each bit in the binary signal train coupled to the shift register 13 is sampled four times. Shift register 12 has four times as many stages as there are bits in the desired word in order to enter all the sampled signals contained in the word.

A multistage storage register 14 is provided in the system of FIG. 1 for storing the bits in the word it is desired to detect. The number of stages in register 14 must therefore be equal to the number of bits in the desired word. The binary signals, or samples, in each stage of the shift register 12 are coupled to one input of a series of exclusive NOR gates designated 15. The number of exclusive NOR gates 15 corresponds with the number of stages in shift register 12. Each stage of the storage register 14 is coupled to a second input of four of the exclusive NOR gates 15 because the binary signals coupled to those four exclusive NOR gates from the shift register 12 should correspond to the four binary signals of a bit in the desired binary word.

The clock circuit 13 also has a portion 13b which produces second clock pulses between each of the first clock pulses. The second clock pulses are coupled to the storage register 14 to cause the bits in each stage of the storage register 14 to be coupled to their respective inputs of the exclusive NOR gates 15. If the two inputs to the exclusive NOR gates 15, one from a stage of the shift register 12 and another from a stage of the storage register 14, correspond that particular exclusive NOR gate 15 will develop a signal. The signals from the exclusive NOR gates 15 are coupled to a counter 16, which also has the second clock pulses coupled thereto for causing it to count the number of signals coupled from the exclusive NOR gates 15. If the number of signals coupled to counter 16 exceeds a predetermined percentage of the total number of possible signals which can be coupled thereto, the counter 16 will develop a detection or comparison signal indicating that the desired binary word has been received. In the preferred embodiment approximately 80% of the possible signals from the exclusive NOR gates 15 must be coupled to the counter 16 before a detection or comparison signal is developed. While the system illustrated in FIG. 1 is only capable of detecting a two bit binary word, it should be understood that a binary word of, for example, twenty three bits is more common and the smaller system illustrated in FIG. 1 is simply utilized for convenience of description.

Figure 2:
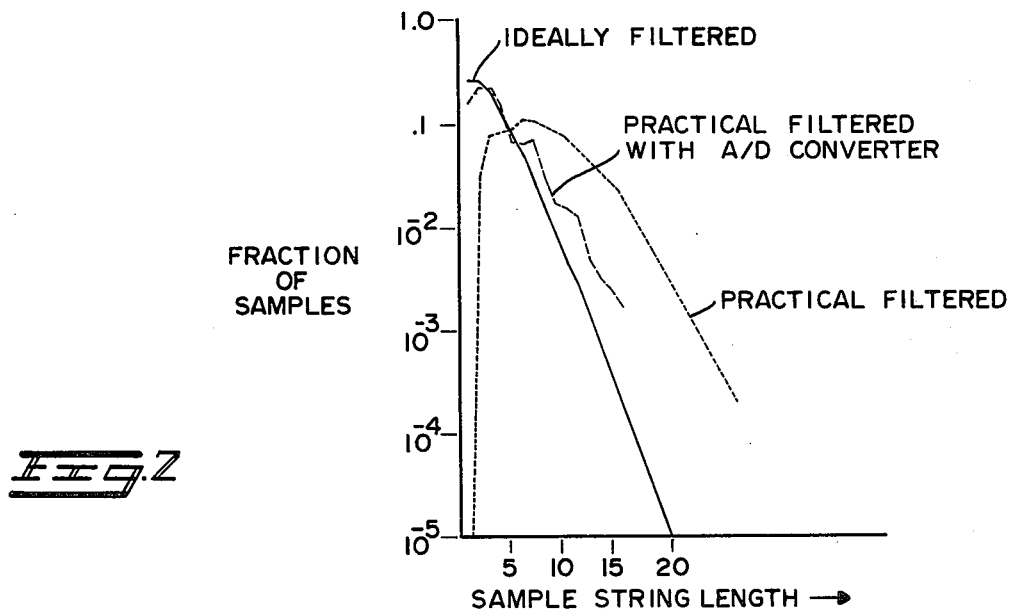
FIG. 2 is a graph illustrating the sample string length for random noise after passing the random noise through an ideal low pass filter, a practical low pass filter, and a practical low pass filter and analog to digital converter embodying the present invention.

The A/D converter 11 has first and second modes of operation controlled by a switch 17, which is in turn connected to receive the output signal from the counter 16. The switch 17 operates to maintain the A/D converter 11 in the first mode of operation until a comparison signal is received from the counter 16, at which time the switch 17 switches the A/D converter 11 to the second mode of operation. In the first mode of operation the A/D converter inserts error pulses into the train of digital signals applied to the shift register 12 whenever a binary pulse exceeds a predetermined length. The predetermined length which must be exceeded is determined by the entire asynchronous converter system and the number of samples taken per bit. For example, in the system of FIG. 1 four samples are taken per bit and an error pulse may be inserted whenever an incoming digital pulse exceeds three bits between transitions. Referring to FIG. 2, the solid line in the graph indicates the probable distribution for the length of a pulse, or the number of samples between transistions, in random noise after the incoming signal is passed through an ideal filter. It should of course be remembered that in the system of FIG. 1 an information bit is made up of four similar samples. The dotted line of FIG. 2 illustrates a shift in the sample string length caused by removing the higher frequencies, such as by inserting the practical low pass filter 10. Because the probability curve is shifted toward the right in FIG. 2 by filtering the incoming signals with a practical, as opposed to an ideal, filter, the number of samples between transitions of random noise is increased (sample string length is increased) and the probability of the system of FIG. 1 falsing on random noise is greatly increased. When the A/D converter 11 is operating in its first mode of operation, error pulses are inserted in the digital train which tend to break up the sample string length and shift the probability curve back to the left, as illustrated by the dashed curve in FIG. 2, with a net result that falsing of the asynchronous detector system in FIG. 1 is greatly reduced. When a comparison signal from counter 16 activates switch 17 the A/D converter 11 is switched to the second mode of operation and error pulses are no longer inserted into the digital train so that the probability curve illustrated in FIG. 2 is shifted back to the dotted line representation and the asynchronous detector of FIG. 1 operates with an increased sensitivity.

Figure 3:
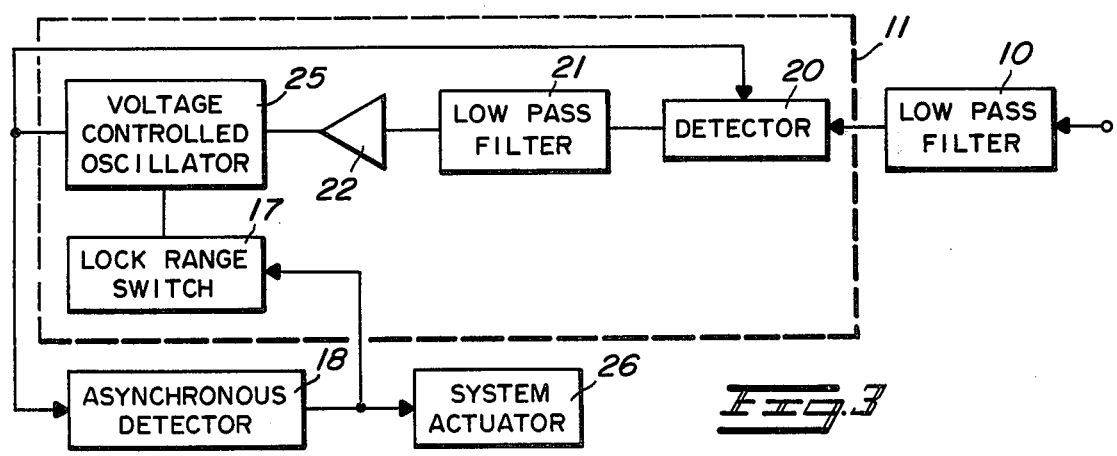
FIG. 3 is a block diagram of an analog to digital converter including a phase locked loop.

FIG. 3 illustrates an embodiment of the system of FIG. 1 wherein a phase locked loop is utilized as the A/D converter 11. In this embodiment the input signal is applied through the low pass filter 10 to a phase detector 20. The output of the phase detector 20 is passed through a loop filter 21 and a loop amplifier 22 to an input of a voltage controlled oscillator 25. An output of the voltage controlled oscillator 25 is applied to a second input of the phase detector 20 and an input of the asynchronous detector. The phase locked loop is a signal conditioning means which, in this embodiment, is constructed so that the voltage controlled oscillator 25 tracks frequency changes of the input with rise times of typically 50 nanoseconds so that analog signals applied from the low pass filter 10 are converted to digital signals at the output of the voltage controlled oscillator 25.

The output of the asynchronous detector 18 is applied to a system actuator 26 which turns on the remainder of the system associated with the asynchronous detector 18, as described in the above-mentioned patent. The output of the asynchronous detector 18 is also applied to the switch 17 which is in turn connected to the voltage controlled oscillator 25. As described above, the A/D converter 11 has first and second modes of operation. In the first mode of operation the voltage controlled oscillator 25 has a relatively high lock frequency range and in the second mode of operation the voltage controlled oscillator 25 has a relatively low lock frequency range. In the high lock frequency range the voltage controlled oscillator 25 tracks low frequency signals but has a tendency to free run so that higher frequency error pulses are inserted in the output digital signal. Once the asynchronous detector 18 senses the predetermined word in the train of digital signals, an output signal is applied to the switch 17 which switches the voltage controlled oscillator 25 into the second mode of operation and, because of the lower lock frequency range, the input signals are tracked very accurately.

Figure 4:
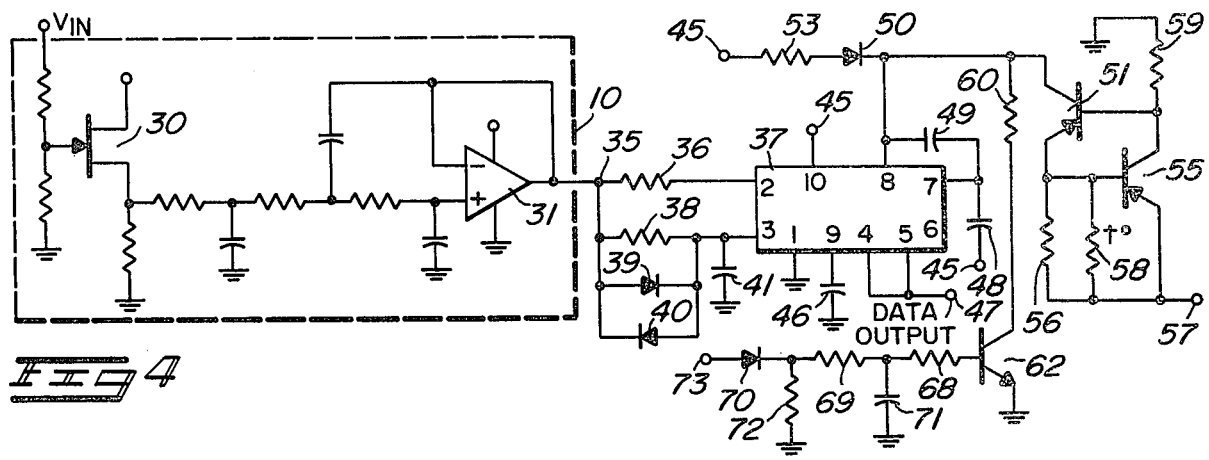
FIG. 4 is a schematic diagram of the phase locked loop illustrated in FIG. 3.

Referring to FIG. 4, a schematic diagram of the low pass filter 10 and the phase locked loop 11 is illustrated. In the low pass filter 10 a JFET transister 30 provides a high to low impedance transfer and an IC circuit 31, along with its associated circuitry, provides three poles of low pass filtering. It should of course be understood that many other types of low pass filters might be utilized but the one illustrated is selected for its effectiveness and simplicity. The output signal from the low pass filter 10 is applied to a junction 35. A resistor 36 is connected from the junction 35 to pin 2 of an IC circuit 37, which along with the associated circuitry includes the phase detector 20, the low pass filter 21, the amplifier 22 and the voltage controlled oscillator 25. The IC circuit 37 may be, for example, a NE565A IC circuit which is commercially available. A second resistor 38 is connected between the junction 35 and pin 3 of the IC circuit 37. Two diodes 39 and 40 are connected in parallel opposition in parallel with the resistor 38 to limit the amplitude of signals applied to the IC 37. A capacitor 41 is connected from pin 3 of the IC 37 to ground. The diodes 39 and 40 are especially effective to bypass large DC transients which arise when an FM system is being utilized and the transmitter and the receiver of two communicating stations are not properly netted. When such a transient occurs the voltage controlled oscillator 25 operates so that the output applied to the asynchronous detector 18 is a series of unsymmetrical alternating pulses, rather than a single continuous high or low pulse. Because of this feature the number of errors seen by the asynchronous detector 18 may actually be reduced and the system has the capability of locking onto the desired signal more quickly.

Pin 1 of the IC 37 is connected directly to ground and pin 10 is connected to a terminal 45, which has a source of positive voltage applied thereto, in this embodiment 10 volts. Pin 9 of IC 37 is connected through a capacitor 46 to ground and pins 4 and 5 are connected together and to an output terminal 47, which is the terminal connected to the asynchronous detector 18. Pin 7 of the IC 37 is connected through a capacitor 48 to the positive voltage terminal 45 and through a capacitor 49 to pin 8 of the IC 37. Pin 8 is also connected to the cathode of a diode 50 and to the collector of a PNP type transistor 51. The anode of the diode 50 is connected through a resistor 53 to the positive voltage terminal 45. The emitter of the transistor 51 is connected directly to the base of a PNP type transistor 55 and through a resistor 56 to a second terminal 57 adapted to have a positive voltage applied thereto, in this embodiment 13.6 volts. A thermistor 58 is connected between the base of the transistor 55 and the positive voltage terminal 57. The collector of the transistor 55 is also connected to the base of the transistor 51 and through a resistor 59 to ground. Transistors 55 and 56 and their associated circuitry form a thermally compensated current source for the IC circuit 37. Pin 8 of the IC 37 is also connected through a resistor 60 to the collector of an NPN type transistor 62, the emitter of which is connected directly to ground. The base of the transistor 62 is connected through a pair of series connected resistors 68 and 69 to the cathode of a diode 70. The junction of the resistors 68 and 69 is connected through a capacitor 71 to ground and the cathode of the diode 70 is connected through a resistor 72 to ground. The anode of the diode 70 is connected to a terminal 73 which is the input terminal that receives the signal from the asynchronous detector 18 indicating that the proper word has been detected. Transistor 62 and its associated circuitry comprise the switch 17 which switches the voltage controlled oscillator 25 from the first mode of operation to the second mode of operation in response to the signal applied to the terminal 73.

With transistor 62 nonconducting (switch open) the phase locked loop lock range is 60 to 380 Hz in this embodiment. And with the transistor 62 conducting (switch closed) the phase locked loop lock frequency range reduces to 5 to 200 Hz. In the upper lock range the 60 Hz frequency is established by the current source, transistors 51 and 55, and diode 50. Diode 50 guarantees that the principal current that flows to the voltage controlled oscillator 25 in the IC 37, when locked on signals below 60 Hz, is supplied by the current source, transistors 51 and 55. When transistor 62 conducts due to a signal on terminal 73, the potential at pin 8 of the IC 37 is lowered and the effect of diode 50 is cancelled. Less current now flows into pin 8 of IC 37 and the lock frequency range of the phase locked loop reduces to 5 to 200 Hz. It is most important to understand that in the higher lock frequency range, frequency below 60 Hz are still tracked by the voltage controlled oscillator 25 but with the insertion of high frequency errors or error pulses. The number of error pulses inserted into the digital output signal increases as the input frequency decreases and the pulse width of the errors can be altered by varying the damping factor of the phase locked loop. Capacitor 71 associated with the transistor 62 provides a delay in the circuitry when switching from the second mode of operation or high lock frequency range back to the first mode of operation or low lock frequency range. In the event the system loses correlation, such as by signal fading or the like, delaying the switching of the voltage controlled oscillator 25 from low lock frequency range back to the high lock frequency range permits rapid reacquisition of the data word or recorrelation of the system.

Figure 5:
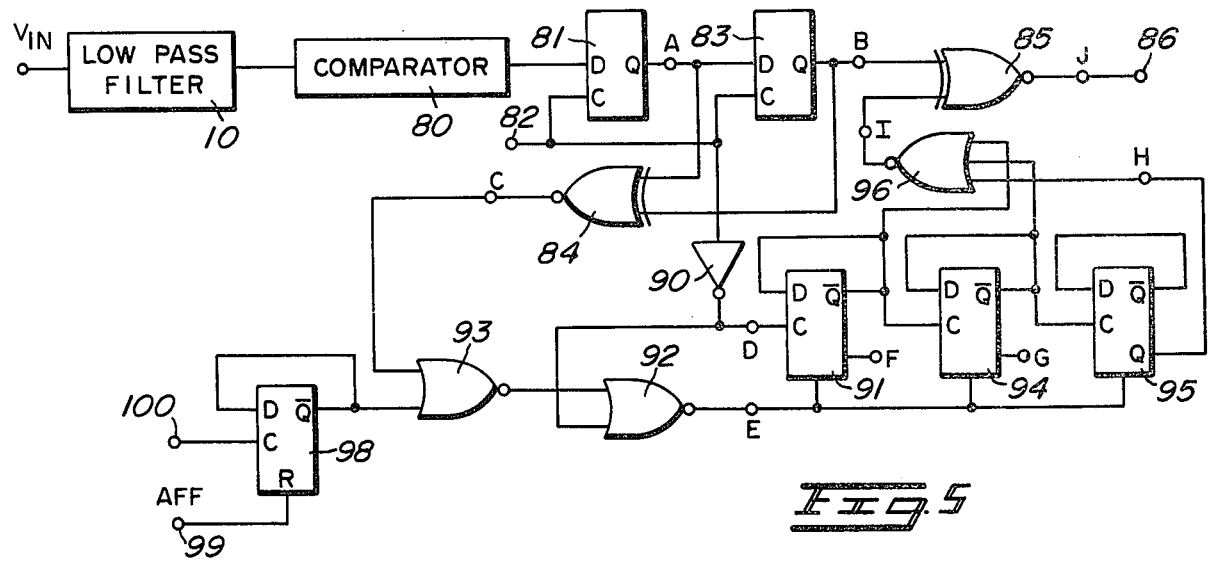
FIG. 5 is a block diagram of an analog to digital converter including digital circuitry.

The A/D converter 11 and switch 17 of the system illustrated in FIG. 1 are illustrated as digital signal conditioning means and digital switch means in the embodiment illustrated in FIG. 5. A comparator 80 is connected to receive the analog signal from the low pass filter 10 and is used in this embodiment to convert the analog signal to square pulses. The output of the comparator 80 is connected to the input terminal of a D register 81, which in this embodiment is a single flip-flop or binary circuit but it should be understood that additional stages might be utilized if additional delay is desired. A second terminal 82 has a source of clock pulses (not shown) attached thereto and is connected to the clock input of the register 81 so that the analog information is clocked through the register at a predetermined rate and, therefore, appears at the output thereof as a train of digital signals. The train of digital signals from the output of the register 81 is applied to the input of a second register 83 and to one input of an exclusive NOR gate 84. Terminal 82 is also connected to the clock input of the register 83 so that the clock pulses are applied thereto and the information is clocked through the register 83 also. A second input of the exclusive NOR gate 84 is attached to the output of the register 83 so that the exclusive NOR gate 84 compares the input and output of the register 83 and provides an output signal whenever a transition of the train of digital signals applied thereto occurs.

Figure 6:
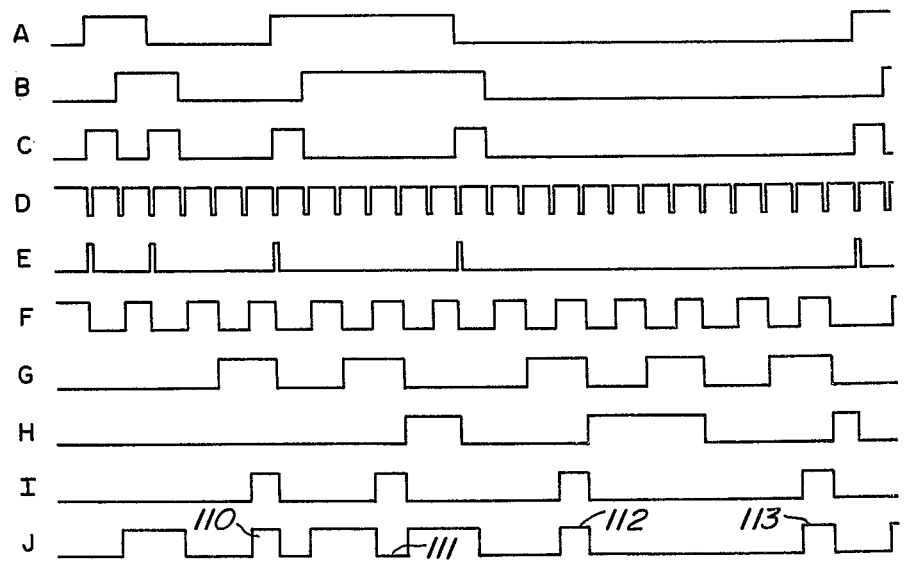
FIG. 6 illustrates the wave forms present at various points in the circuitry of FIG. 5.

Typical output signals from the registers 81 and 83 are illustrated in waveforms A and B, respectively, of FIG. 6. The pulses at the output of the exclusive NOR gate 84 which appear as a result of the waveforms at the outputs of the registers 81 and 83 is illustrated by waveform C of FIG. 6. The output of the register 83 is also applied to an input of an exclusive OR gate 85, the output of which is connected to a terminal 86. Terminal 86 is the data output terminal and is connected to the input of the asynchronous detector 18. The clock pulses appearing at the terminal 82 are also connected through an inverter 90 to the clock input of a flip-flop or binary circuit 91 and to an input of a NOR gate 92. The output pulses or signals from the exclusive NOR gate 84 are applied to one input of a NOR gate 93 the output of which is connected to a second input of the NOR gate 92. The inverted output of the binary circuit 91 is connected to the clock input of a second binary circuit 94 and the inverted output of the second binary circuit 94 is connected to the clock input of a third binary circuit 95. The output of the NOR gate 92 is applied to the reset terminals of the three binary circuits, 91, 94 and 95. The inverted output of the binary circuit 91 is also connected to the input thereof and to one input of a NOR gate 96. The inverted output of the binary circuit 94 is also connected to the input thereof and to a second input of the NOR gate 96. The inverted output of the binary circuit 95 is connected to the input thereof and the noninverted output is connected to a third input of the NOR gate 96. The binary circuits 91, 94 and 95 form counting means for counting the number of inverted clock pulses applied to the clock input of the binary circuit 91 between the times that the binary circuits 91, 94 and 95 are reset by a signal appearing at the output of the NOR gate 92.

The inverted clock pulses at the clock input of the binary circuit 91 are illustrated as waveform D in FIG. 6 and the signals appearing at the output of the NOR gate 92 are illustrated as waveform E in FIG. 6. The noninverted outputs of the binary circuits 91, 94 and 95 are illustrated as waveforms F, G and H, respectively, in FIG. 6. The signal which appears at the output of the NOR gate 96 as a result of the combination of the inverted output signal from the binary circuit 91, the inverted output signal from the binary circuit 94 and the noninverted output signal from the binary circuit 95 is illustrated as waveform I in FIG. 6 and the output signal from the entire circuit as it appears at terminal 86 is illustrated as waveform J in FIG. 6.

Referring to waveforms A and E of FIG. 6, it can be seen that the NOR gate 92 applies a pulse to the reset terminals of the binary circuits 91, 94 and 95 each time a transition occurs in the waveform appearing at the output of the register 81. After each transition of the data, or reset of the counting means, the counting means begins to count the inverted clock pulses applied thereto. If three clock pulses occur before the next pulse from the NOR gate 92 is applied to the reset inputs, all three of the signals applied to the NOR gate 96 are low so that an output signal is applied to the exclusive NOR gate 85 and a pulse (i.e. pulse 113 in waveform J) is inserted in the train of digital signals appearing at the output terminal 86. If no transitions in the data occur and, hence, no reset pulses are applied to the counting means before an addition eight clock pulses are applied thereto, another pulse will be inserted in the train of digital signals appearing at the output terminal 86. Thus, in this mode of operation the circuit continually measures the length of digital pulses in the train of digital signals and inserts error pulses whenever the pulse length exceeds a predetermined time.

Switch means, which comprise a flip-flop or binary circuit 98 are utilized to switch the circuitry of FIG. 5 between the first mode of operation, described above, and a second mode of operation wherein the counting means is deactivated and the train of digital signals from the registers 81 and 83 pass through the exclusive NOR gate 85 directly to the output terminal 86 without having error pulses inserted therein. The binary circuit 98 has an inverted output thereof connected to the input and to a second input of the NOR gate 93. The binary circuit 98 normally applies a low singal to the NOR gate 93 so that the binary circuit 98 operates like a simple inverter and the A/D converter is in the first mode of operation. However, when the binary circuit 98 is activated a continuous high signal is applied to the NOR gate 93 and a continuous low signal is applied to the NOR gate 92 so that it operates as a simple inverter for the inverted clock pulses from the inverter 90 and the counting means is reset on every clock pulse. The reset terminal of the binary circuit 98 is connected to an input terminal 99, which is adapted to receive the output signal from the asynchronous detector 18 to switch the circuitry illustrated in FIG. 5 into the second mode of operation when the predetermined word is sensed by the asynchronous detector 18. The circuit switches back into the first mode of operation when a signal is applied to a terminal 100 connected to the clock input of the binary circuit 98 and a delay (not shown) is incorporated in the application of this signal so that the circuit will remain in its more sensitive mode of operation for a short period of time after losing correlation and, thus, recorrelation may occur very rapidly as described above.

Thus, analog to digital converter circuits are illustrated which, in combination with an asynchronous detector of the type described, greatly reduce the noise falsing of the asynchronous detector in a first mode of operation and improve the sensitivity in a second mode of operation. Further, by adding delay in switching from the second mode of operation to the first mode of operation the system can lose correlation for a short period and recorrelate very rapidly. While we have shown and described two specific embodiments of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. In combination with an asynchronous detector for detecting a particular digital word within a train of signals wherein the train of signals includes bits, each bit having a predetermined period, and the detector samples each bit a plurality of times, compares the samples to a stored predetermined word and provides a comparison signal in response to a predetermined number of correlations between the samples and the stored word, an analog to digital converter comprising:

a. signal conditioning means having input means for receiving analog signals, output means coupled to the detector and having first and second modes of operation, for converting the received analog signals to digital signals in both modes of operation and inserting periodic error pulses in the digital signals when a digital pulse extends beyond a predetermined time in the first mode of operation; and b. switch means coupled to said signal conditioning means for switching said signal conditioning means between the first and second modes of operation, said switch means including input means coupled to the detector for receiving the comparison signal therefrom and switching said signal conditioning means from the first to the second mode of operation in response thereto.

2. An analog to digital converter in combination with an asynchronous detector as claimed in claim 1 wherein the signal conditioning means includes a phase locked loop.

3. An analog to digital converter in combination with an asynchronous detector as claimed in claim 2 wherein the lock frequency range of the phase locked loop in the first mode of operation is higher than the lock frequency range in the second mode of operation.

4. An analog to digital converter in combination with an asynchronous detector as claimed in claim 3 wherein the lock frequency range of the phase locked loop in the first mode of operation is approximately 60 to 380 Hz and in the second mode of operation is approximately 5 to 200 Hz.

5. An analog to digital converter in combination with an asynchronous detector as claimed in claim 1 wherein the signal conditioning means includes flip-flop means having an input and an output and a source of clock pulses connected thereto for converting an analog signal applied to the input to a digital signal, comparison means coupled to the input and the output of said flip-flop means for sensing changes of state thereof and providing an output signal in response to each change of state, and counting means coupled to said comparison means, said source of clock pulses and the output of said flip-flop means and responsive to the output signals of said comparison means and the clock pulse to insert an error pulse in the digital signal at the ouput of said flip-flop means when the time between the output signals of said comparison means exceeds a predetermined time.

6. An analog to digital converter in combination with an asynchronous detector as claimed in claim 5 wherein the switch means is connected to disable the counting means in the second mode of operation.

7. An analog to digital converter in combination with an asynchronous detector as claimed in claim 6 wherein the switch means includes a flip-flop connected to change state in response to the comparison signal from the detector.

8. An analog to digital converter in combination with an asynchronous detector as claimed in claim 5 wherein the flip-flop means includes two flip-flops connected in series and the comparison means includes an exclusive OR gate having an input connected to the output of one of the flip-flops and a second input connected to the output of the other flip-flop.

9. An analog to digital converter in combination with an asynchronous detector as claimed in claim 5 wherein the counting means includes a three stage digital counter having the clock pulses applied to an input thereof and the output signal of the comparison means applied to a reset input so that the clock pulses between output signals are counted, said counter being further connected for providing an output pulse after counting three clock pulses.

10. An analog to digital converter in combination with an asynchronous detector as claimed in claim 1 including a low pass filter coupled to the input means of the signal conditioning means for supplying analog signals thereto.

11. In combination with an asynchronous detector for detecting a particular digital word within a train of signals wherein the train of signals includes bits, each bit having a predetermined period, and the detector samples each bit a plurality of times, compares the samples to a stored predetermined word and provides a comparison signal in response to a predetermined number of correlations between the samples and the stored word, an analog to digital converter comprising:

a. a phase locked loop having first and second lock frequency ranges, input means for receiving analog signals and output means;

b. switching means coupled to said phase locked loop for switching said loop between first and second lock frequency ranges;

c. means coupling the comparison signal from the detector to said switching means for switching said loop into the first lock frequency range until the comparison signal is received and switching said loop into the second lock frequency range when the comparison signal is received; and d. the output means of said phase locked loop being coupled to an input of the detector.

12. An analog to digital converter in combination with an asynchronous detector as claimed in claim 11 wherein the coupling means includes delay means for switching said loop from the second lock frequency range to the first lock frequency range.

13. An analog to digital converter in combination with an asynchronous detector as claimed in claim 11 including a low pass filter coupled to the input means of the phase locked loop for supplying analog signals thereto.

14. An analog to digital converter in combination with an asynchronous detector as claimed in claim 13 wherein the input means of the phase locked loop include a pair of diodes connected in parallel opposition for limiting the signals applied to the phase locked loop.

15. An analog to digital converter comprising:

a. signal conditioning means having input means for receiving analog signals thereon and output means, and signal conditioning means further having first and second modes of operation for converting the received analog signals to digital signals in both modes of operation and inserting periodic error pulses in the digital signals when a digital pulse extends beyond a predetermined time in the first mode of operation; and b. switch means coupled to said signal conditioning means for switching said signal conditioning means between the first and second modes of operation, said switch means having an input and switching said signal conditioning means from the first to the second mode of operation in response to a predetermined signal thereon.

16. An analog to digital converter as claimed in claim 15 wherein the signal conditioning means includes a phase locked loop.

17. An analog to digital converter as claimed in claim 16 wherein the lock frequency range of the phase locked loop in the first mode of operation is higher than the lock frequency range in the second mode of operation.

18. An analog to digital converter as claimed in claim 17 having in addition delay means associated with the switch means for switching the signal conditioning means from the first to the second mode of operation approximately instantaneously and from the second to the first mode of operation with a predetermined delay.

19. An analog to digital converter comprising:
signal conditioning means including binary means having an input and an output and a source of clock pulses connected thereto for converting an analog signal applied to the input to a digital signal, comparison means coupled to the input and the output of said binary means for sensing changes of state thereof and providing an output signal in response to each change of state, and counting means coupled to said comparison means, said source of clock pulses and the output of said binary means and responsive to the output signals of said comparison means and the clock pulses to insert an error pulse in the digital signal at the output of said binary means when the time between the output signals of said comparison means exceeds a predetermined time; and switch means coupled to said signal conditioning means for switching said signal conditioning means between a first mode of operation wherein said counting means is operative to insert the error pulses and a second mode of operation wherein said counting means is inoperative.

* * * * *